UNITED STATES PATENT OFFICE.

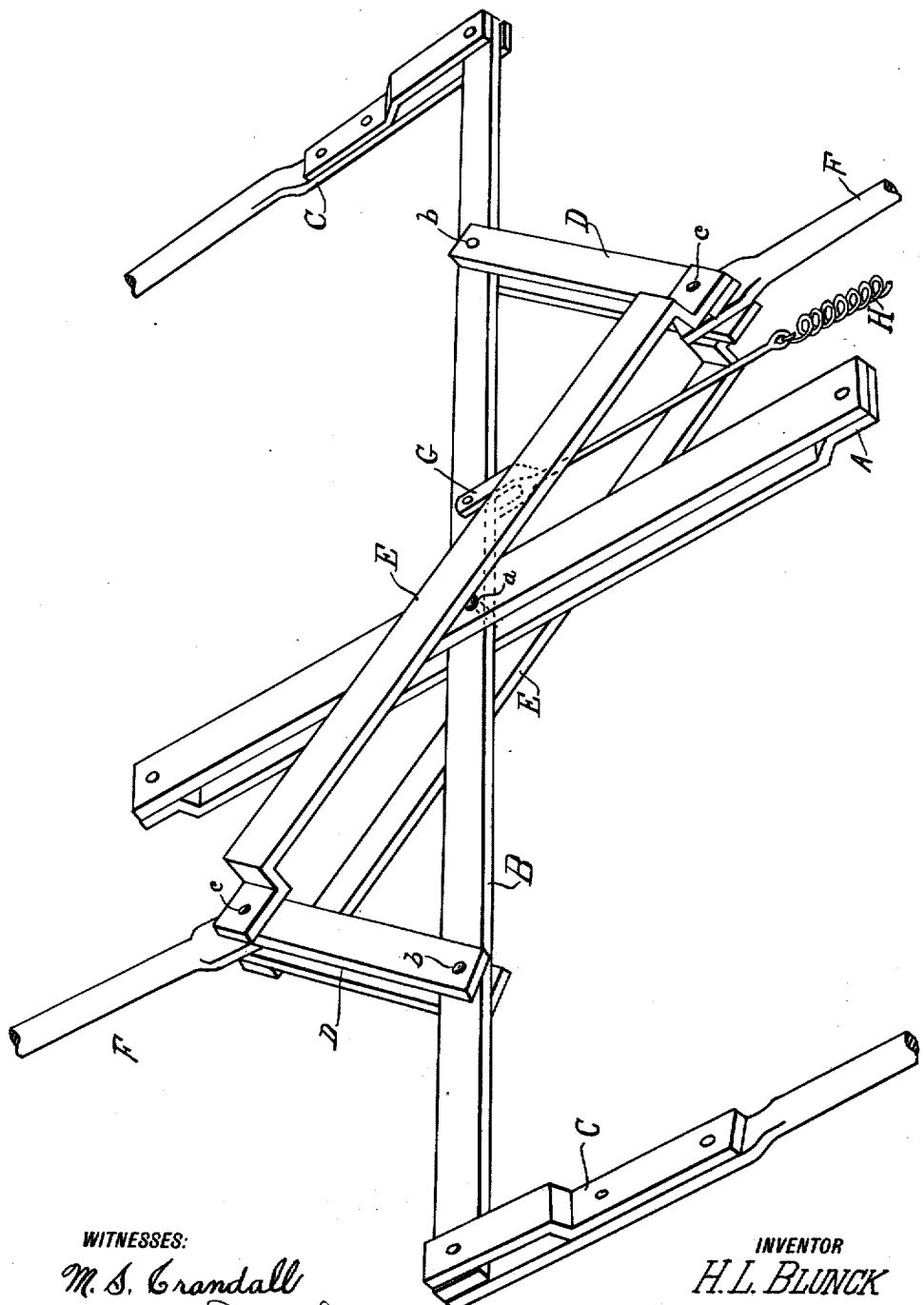

HENRY LEWIS BLUNCK, OF SIOUX CITY, IOWA.

BRAKE-EQUALIZER.

1,007,057.  Specification of Letters Patent.  Patented Oct. 31, 1911.

Application filed June 29, 1911. Serial No. 635,938.

*To all whom it may concern:*

Be it known that I, HENRY LEWIS BLUNCK, a citizen of the United States, residing at Sioux City, in the county of Woodbury and State of Iowa, have invented certain new and useful Improvements in Brake-Equalizers, of which the following is a specification.

My invention relates to brake attachments and is an improvement upon the invention for which Letters Patent of the United States No. 977,998 were issued to me on December 6th 1910.

The object of this invention is to further improve upon and perfect that invention and render the same more serviceable.

The weakness of my former invention lies in the fact that if one of the brake rods is broken or a part of the brake disabled the brake upon both trucks becomes useless. In this invention I have so constructed and arranged the different parts that the brake on each side or on each truck will act unless that part of the brake attachment is broken or disabled, as will be hereinafter more fully explained.

I have illustrated my invention in the accompanying drawing in which the figure is a perspective view of the equalizing brake attachment, the rods connecting the equalizer to the operating devices and the brake mechanism being broken off.

In the drawing the slotted or bifurcated bar A is the keeper, corresponding to the same member in my former patent, the same being secured to the under side of the car body parallel to its longitudinal axis. A transverse lever B is pivoted centrally at $a$ in the slot of the keeper and slotted rods C are pivoted to its ends and extend in opposite directions to the ends of the car where they are pivoted to hand levers, as shown in my former patent, or to other devices for moving them lengthwise to operate the brake. Double parallel bars D are pivoted to and inclose the transverse lever B near its ends at $b$ and on opposite sides of the lever, and the opposite ends of the bars D are pivotally connected at $c$ to the parallel bars E between the ends of the latter. The bars E extend over and under the keeper A and lever B and lie normally between the angles formed by the keeper and lever. Brake rods F are pivotally connected with the bars D and E at their junction between the ends of the former and on opposite sides of the lever B. One of the brake rods is adapted to be pivotally connected with a lever which forms a part of the brake mechanism of a four wheeled car-truck, as seen in Fig. 3 of my former patent. The other brake rod is similarly connected with the brake mechanism of another truck. The keeper A, transverse lever B, rods C and the brake rods F perform the same function in the same manner as the similar members in the former patent.

My invention consists in the arrangement of the brake rods and their attachment on opposite sides of the lever B to the ends of the bars D and E. The bars D and E serve as an extension of the brake rods. It will be seen that if one of the brake rods, or one of the bars D or the bars E are broken, the opposite side, that is, the other brake rod and the bars D connected thereto, will straighten out, the connected bars D serving only to lengthen the brake rod, and only the part connected with one truck will become inoperative. It is necessary if both sides become inoperative that the brake rods both break or both pairs of the bars D or the lever A be broken. The equalization of the action of the brakes on each truck is attained in the same manner as before and the operation simplified.

In the construction of my improvement stock material may be used and none of the parts need be forged.

A forked rod G is pivoted to the lever B at one side of the center, the opposite end of the rod being secured to a spiral spring H, adapted to be secured to the car frame. The brake operates against the spring and when set is released and restored to normal position by the action of the spring. I prefer to attach the rod to the lever itself as the action of the spring is thus quicker and more direct.

Having described my invention, what I claim as new and desire to secure by Letters Patent, is,—

1. An equalizing brake attachment, consisting of a transverse lever, pivoted centrally, rods pivoted to the ends of said lever and adapted to be connected with devices for operating the brakes, brake rods extending in opposite directions to the brake mechanism, bars D pivotally connected to the brake rods at one end and to the transverse lever at the opposite ends near the ends of the transverse lever and on opposite sides thereof, connecting bars E pivotally secured at each end to the ends of the brake rods and the bars D at their junction, the bars D and connecting bars forming an extension of the brake rods connecting them with the lever, and a spring connecting the lever with the car body, substantially as described.

2. The combination in a brake equalizer, of a transverse lever pivoted centrally beneath a car body, brake rods extending in opposite directions to the brake mechanism, bars D pivotally connected to the brake rods and to the transverse lever near its ends on opposite sides thereof, and connecting bars E pivotally secured to the brake rods and to the bars D at the junction thereof, said bars D and connecting bars forming an extension of the brake rods connecting the rods to the transverse lever, substantially as described.

In testimony whereof I have hereunto signed my name in the presence of two subscribing witnesses.

HENRY LEWIS BLUNCK.

Witnesses:
H. C. GARDINER,
J. S. NELSON.

Copies of this patent may be obtained for five cents each, by addressing the "Commissioner of Patents, Washington, D. C."